United States Patent
Gutman et al.

(10) Patent No.: US 7,103,017 B2
(45) Date of Patent: Sep. 5, 2006

(54) TECHNIQUES FOR IMPLEMENTING TELEPHONIC, FAX, AND/OR DATA COMMUNICATIONS USING INTERNET PROTOCOLS AND SATELLITE LINKS

(75) Inventors: Donald Gutman, Commack, NY (US); Paul Delgado, Selden, NY (US)

(73) Assignee: Globecomm Systems Inc., Hauppauge, NY (US)

( * ) Notice: Subject to any disclaimer, the term of this patent is extended or adjusted under 35 U.S.C. 154(b) by 805 days.

(21) Appl. No.: 09/774,207

(22) Filed: Jan. 30, 2001

(65) Prior Publication Data

US 2002/0101831 A1 Aug. 1, 2002

(51) Int. Cl.
*H04B 7/185* (2006.01)
*H04L 12/66* (2006.01)
*H04J 3/16* (2006.01)
*H04J 3/04* (2006.01)

(52) U.S. Cl. .................. 370/316; 370/352; 370/468; 370/535

(58) Field of Classification Search ................ 370/316, 370/466, 535, 401, 352; 455/12.1, 427, 428
See application file for complete search history.

(56) References Cited

U.S. PATENT DOCUMENTS

| | | | |
|---|---|---|---|
| 5,912,883 A | | 6/1999 | Hershberg |
| 5,963,621 A * | | 10/1999 | Dimolitsas et al. ....... 379/93.08 |
| 6,073,013 A | | 6/2000 | Agre et al. .................. 455/428 |
| 6,088,589 A | | 7/2000 | Valentine et al. ........... 455/433 |
| 6,175,562 B1 * | | 1/2001 | Cave ........................... 370/352 |
| 6,282,192 B1 * | | 8/2001 | Murphy et al. ............. 370/352 |
| 6,553,225 B1 * | | 4/2003 | Zhao et al. ................. 455/427 |
| 6,570,849 B1 * | | 5/2003 | Skemer et al. ........... 370/230.1 |
| 6,584,083 B1 * | | 6/2003 | Toporek et al. ............. 370/316 |
| 6,665,280 B1 * | | 12/2003 | Forssell et al. ............. 370/329 |
| 2001/0026537 A1 * | | 10/2001 | Massey ....................... 370/316 |

* cited by examiner

*Primary Examiner*—Huy D. Vu
*Assistant Examiner*—Daniel Ryman
(74) *Attorney, Agent, or Firm*—Morgan, Lewis & Bockius LLP

(57) ABSTRACT

A mobile auxiliary communications facility for use with a satellite-equipped communications link and a gateway hub. The satellite-based communications link is adapted to provide one or more Internet Protocol (IP) communication pathways between a first location and a second location. The gateway hub, situated at the first location, is coupled to a terrestrial data network and also to a terrestrial telephonic network. The mobile auxiliary communications facility of the present invention includes a utilization mechanism for utilizing the IP communication pathways to implement one or more bi-directional telephonic communication links and one or more bi-directional data links between the first location and the second location. The mobile auxiliary communications facility is equipped with a conversion/deconversion mechanism and a bandwidth allocation, multiplexing and demultiplexing mechanism. In operation, the mobile auxiliary communications facility is deployed to a second location which represents a site that does not have access to a terrestrial communications network, a site where access to a terrestrial network has been interrupted, and/or a site where a terrestrial network is not functional. The conversion/deconversion mechanism converts voice, speech, and/or audio signals into a packet format compatible with standard Internet Protocol (IP) data transmissions. The bandwidth allocation, multiplexing and demultiplexing mechanism allocates the available bandwidth of a communications link by combining voice and data packets into a single composite IP data channel. This combination process is performed in accordance with usage, demand, and/or a set of quality of service (QoS) prioritization parameters. The bandwidth allocation, multiplexing and demultiplexing mechanism responds to a momentary lack of voice activity by temporarily reducing the number of voice IP packets on the composite IP data channel.

44 Claims, 2 Drawing Sheets

TECHNIQUES FOR IMPLEMENTING TELEPHONIC, FAX, AND/OR DATA COMMUNICATIONS USING INTERNET PROTOCOLS AND SATELLITE LINKS

FIELD OF THE INVENTION

The invention relates generally to techniques for implementing voice, facsimile, and data communications. More specifically, the invention relates to techniques for providing communications to and from locations that do not have access to a terrestrial network, locations where access to a terrestrial network has been interrupted, and/or locations where a terrestrial network is not functional.

BACKGROUND ART

Terrestrial communication networks provide sufficient capacity and connectivity for many telephonic and computer network applications. However, the performance of these terrestrial networks is inadequate in many situations. For example, the communications capacity and/or connectivity of an existing facility may not be sufficient for a given application, or may not be suitable to meet the needs of a changing operational environment. Providing new terrestrial links and installing additional equipment at a communications site can be a time-consuming process or, worse yet, such links may be impossible to install. A variation of this problem occurs whenever there is a temporary need for connectivity to a location that does not provide any existing terrestrial communications infrastructure. These situations arise in the context of special events from remote locations, and also where communications may be required for large but temporary deployments of personnel. Examples include highway construction projects, winter sporting events, plane crashes, political summits, disaster relief efforts, disaster recovery scenarios, and the restoration of disrupted business communications. In these cases, it is not economical to install the communications infrastructure for the limited time that it would be required.

Even in locations where adequate infrastructure is already in place, communications may be interrupted due to natural or man-made disasters. Oftentimes, it is not possible to restore the interrupted communication pathways within a reasonable period of time. In the examples enumerated above, substantial revenue can be lost as a result of insufficient or broken links. One potential solution is the installation and maintenance of permanent redundant links or alternative communication pathways. At best, this is a very expensive and time-consuming process. In the more extreme cases, it is physically impossible to provide the needed pathways. Notwithstanding the foregoing considerations, major corporations often have no choice but to install costly and inefficient redundant links, as these entities are required by their stockholders to implement disaster recovery plans to protect corporate revenues in the event of a disaster that damages communication facilities or terrestrial links.

At the present time, industry relies upon any of two methods, "Hot Sites" and "Hitching Posts", to provide for a temporary business recovery until the main facilities are restored. Hot Sites are prefabricated "brick-and-mortar" facilities housing redundant work areas, equipment and communication links. Hitching posts are pre-positioned connections providing direct land-line communication links to the PSTN (public switched telephone network) and/or to a computer network. In practice, one or more modular mobile trailers containing work areas are trucked to the hitching posts and connected to provide a basic business recovery solution.

A significant shortcoming of the "Hot Sites" and "Hitching Posts" approaches is cost. Hot Sites are expensive, fully redundant facilities that are not utilized efficiently during times of normal operation. Hitching Posts are disadvantageous in that multiple hitching post sites are generally required to provide sufficient coverage of potential disaster zones. In addition, different corporations, or even separate offices within the same corporation, may require different amounts of telephony and data recovery requirements. Each corporation and office may operate using its own set of advanced voice services, and each may require different computer network interfaces. These factors require the custom configuration of recovery services, and the sizing of these services for the largest facility to be recovered. In some cases, the foregoing limitations essentially require each corporation to purchase their own recovery facilities.

Another drawback to existing approaches is that the Hitching Post or Hot Site facilities are susceptible to catastrophes themselves. An earthquake can take out not only the primary facility, but a hitching post as well. Yet another drawback is that the Hot Site or Hitching Post recovery location may be a great distance from the affected facility. This can result in significant expenditures to relocate employees to the recovery site. In addition, employees may choose to cease employment rather than submit to the relocation.

Although the foregoing discussion has focused upon disaster recovery and the restoration of business communications, the Hot Site or Hitching Post approaches are adaptable to other applications, such as special events situations and circumstances where emergency communications are necessary. Unfortunately, the Hot Site and Hitching Post approaches present similar shortcomings when they are applied to disaster relief, special events, or other applications.

SUMMARY OF THE INVENTION

In view of the aforementioned deficiencies of prior art systems, it is an object of the invention to provide a system for rapidly providing PSTN (public switched telephone network) and computer network communication links at remote locations.

It is another object of the invention to provide a system for remotely accessing PSTN and computer networks without using existing landline telecommunications infrastructure at the remote site.

It is yet another object of the invention to provide a communications link between one or more mobile auxiliary facilities and a primary backup location that provides connectivity to PSTN services and computer networks through existing infrastructure.

It is yet another object of the invention to provide a system that is equipped to remotely access this primary backup location over long distances.

It is yet another object of the invention to provide a system that allows simultaneous access to the primary backup location from any of a plurality of remote locations or mobile auxiliary facilities.

It is also an object of the invention to provide a scaleable system that provides for deployment and operation of remote communication links across a wide range of telephonic and computer networks.

It is also an object of this invention to provide a system that is flexible in allocation of voice, facsimile, and data capacities such that the system may easily accommodate various user applications.

It is also an object of the invention to provide a system that is efficient in the use of bandwidth for voice, facsimile, and data communications.

It is also an object of this invention to provide optional encryption devices, which can be used to provide secure voice and data communication links.

The aforementioned and other objects of the invention are achieved in the form of a mobile auxiliary communications facility for use with a satellite-equipped communications link and a gateway hub. The satellite-equipped communications link is adapted to provide one or more Internet Protocol (IP) communication pathways between a first location and a second location. The gateway hub, situated at the first location, is coupled to a terrestrial data network and also to a terrestrial telephonic network. The mobile auxiliary communications facility of the present invention includes a utilization mechanism for utilizing the IP communication pathways to implement one or more bi-directional telephonic communication links and one or more bi-directional data links between the first location and the second location. The mobile auxiliary communications facility is equipped with a conversion/deconversion mechanism and a bandwidth allocation, multiplexing and demultiplexing mechanism. In operation, the mobile auxiliary communications facility is deployed to the aforementioned second location which represents a site that does not have access to a terrestrial communications network, a site where access to a terrestrial network has been interrupted, and/or a site where a terrestrial network is not functional. The term "mobile", as used herein, refers to the fact that the auxiliary communications facility can be moved from place to place. Its use is not limited to a fixed or specified location.

The conversion/deconversion mechanism converts voice, speech, and/or audio signals into a packet format compatible with standard Internet Protocol (IP) data transmissions. The conversion/deconversion mechanism is also adapted to deconvert an IP data packet transmission into a voice, speech, and/or audio signal, so as to permit standard full-duplex telephonic communications and, optionally, to provide any of various advanced telephone services. Optionally, the conversion/deconversion mechanism may also include a compression mechanism for compressing and decompressing these voice, speech, and/or audio signals so as to utilize available bandwidth, so as to reduce required bandwidth, and/or so as to reduce required storage space.

The bandwidth allocation, multiplexing and demultiplexing mechanism allocates the available bandwidth of a communications link by combining voice and data packets into a single composite IP data channel. This combination process is performed in accordance with usage, demand, and/or a set of quality of service (QoS) prioritization parameters. Bandwidth may be allocated using any of a number of allocation techniques. Illustratively, the bandwidth allocation, multiplexing and demultiplexing mechanism responds to a momentary lack of voice activity by temporarily reducing the number of voice IP packets on the composite IP data channel. In addition to integrating data packets, the bandwidth allocation, multiplexing and demultiplexing mechanism is also adapted to segregate data packets on the composite IP data channel into each of a plurality of voice channels. Accordingly, the bandwidth allocation, multiplexing and demultiplexing mechanism is bi-directional.

The conversion/deconversion mechanism includes one or more communication ports adapted for coupling to one or more telephonic devices. The bandwidth allocation, multiplexing and demultiplexing mechanism includes at least one data port adapted for coupling to one or more endpoint devices such as a computing device.

The gateway hub is coupled to the PSTN (public switched telephone network), and also to at least one data network. Illustratively, this data network could be the Internet, a proprietary corporate network, and/or a governmental communications network. The gateway hub includes a routing mechanism for routing analog and/or digital voice traffic to and from the PSTN, and for routing data packets to and from the data network.

In this manner, the mobile auxiliary communications facility provides telephonic communication paths and Internet Protocol data paths which are accessible from any of a plurality of locations throughout the world, thereby providing an alternative to non-operational and/or nonexistent landline communication links.

Pursuant to a further embodiment of the invention, the mobile auxiliary communications facility is provided in the form of one or more mobile communications shelters. The conversion/deconversion mechanism is implemented by one or more VoIP (Voice to Internet Protocol) Routers, and the bandwidth allocation, multiplexing and demultiplexing mechanism is implemented by an aggregation router. The aggregation router, coupled to one or more VoIP Routers, allocates the available bandwidth of a communications link by combining voice and data packets into a single composite IP data channel. This combination process is performed in accordance with usage, demand, and/or a set of quality of service (QoS) prioritization parameters. Bandwidth may also be allocated by sensing the relative level of voice activity, and, in response thereto, placing a greater or lesser proportion of packets representing voice on the composite IP data channel. Alternatively, a single router could be used to implement the functionality of the VoIP Router as well as the aggregation router, or these functions could be distributed amongst a plurality of different routers.

The composite IP data channel generated by the aggregation router is conveyed to a first modem, where the data channel is placed into a format suitable for transmission over a wireless data link. The first modem is coupled to a satellite earth station, which conveys the composite data channel to an orbiting satellite. The orbiting satellite then relays the composite data stream, through a second modem, to a gateway hub. The gateway hub is coupled to a terrestrial telephone network and also to a terrestrial data network. The gateway hub includes a routing mechanism adapted to direct each of a plurality of incoming IP packets on a composite IP data channel to an appropriate telephone line on the telephone network or to an appropriate data line on the terrestrial data network following conversion to analog and/or digital voice traffic.

The communication shelters provide a mechanism by which telephonic services as well as computer network services may be accessed from remote locations or communication-disabled locations. These services are provided by using a gateway hub to access existing telephone infrastructure and computer networks. Any number of mobile communications shelters may be utilized to meet the requirements of specific system applications. Accordingly, the present system is scaleable to meet the communication requirements of small, medium-sized, and large applications. For larger applications, the gateway hub may be connected to a plurality of these remote or communication-disabled locations through an earth-orbiting satellite. Users at multiple remote sites are then able to communicate with the gateway hub simultaneously.

DETAILED DESCRIPTION OF THE PREFERRED EMBODIMENTS

Figure 1:
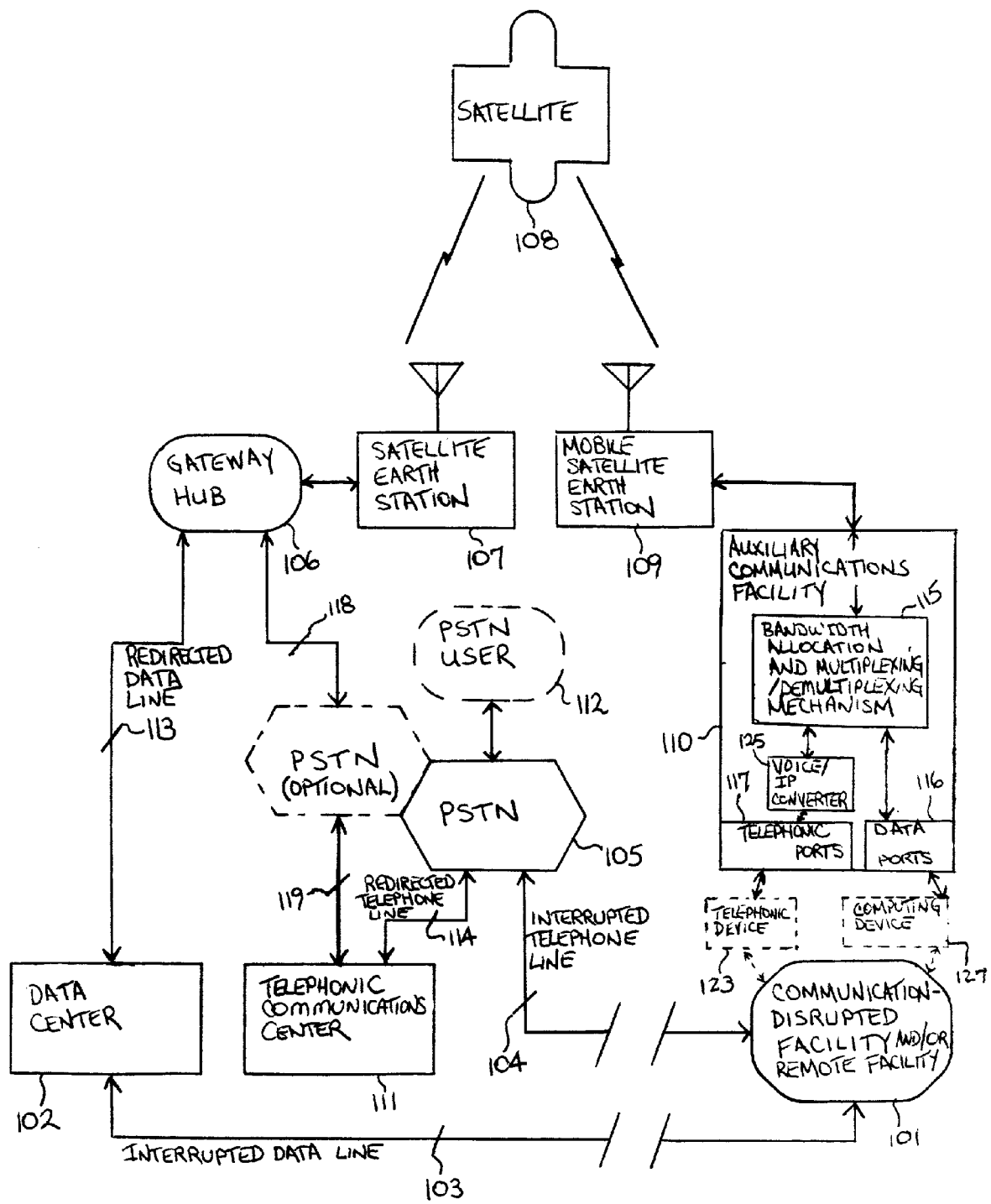
FIG. 1. is a hardware block diagram showing a communications system for implementing the techniques of the present invention in accordance with a first embodiment disclosed herein.

Refer now to FIG. 1, which is a hardware block diagram showing a communications system for implementing the techniques of the present invention in accordance with a first embodiment disclosed herein. Briefly, a satellite-equipped communications link provides one or more Internet Protocol (IP) communication pathways between a gateway hub 106 and a mobile auxiliary communications facility 110. These communication pathways are used to implement one or more bi-directional telephonic communication links, and one or more bi-directional data links. The mobile auxiliary communications facility 110 is equipped with a conversion/deconversion mechanism and a bandwidth allocation, multiplexing and demultiplexing mechanism 115. The conversion/deconversion mechanism, shown in FIG. 1 as voice/IP converter 125, converts voice, speech, and/or audio signals into a packet format compatible with standard Internet Protocol (IP) data transmissions. Voice/IP converter 125 is also adapted to deconvert an IP data packet transmission into a voice, speech, and/or audio signal. Accordingly, Voice/IP converter 125 is bi-directional, in that it can convert a voice signal into an IP data transmission, and it can also deconvert an IP data transmission into a voice signal, so as to permit standard full-duplex telephonic communications. Optionally, voice/IP converter 125 may also include a compression mechanism for compressing and decompressing these voice, speech, and/or audio signals so as to utilize available bandwidth, reduce required bandwidth, and/or reduce required storage space.

The bandwidth allocation, multiplexing and demultiplexing mechanism 115 allocates the available bandwidth of a communications link by combining voice and data packets into a single composite IP data channel. This combination process is performed in accordance with usage, demand, and/or a set of quality of service (QoS) prioritization parameters. Bandwidth may be allocated using any of a number of allocation techniques. Illustratively, voice/IP converter 125 responds to a momentary lack of voice activity by temporarily reducing the number of voice IP packets on the composite IP data channel. As in the case of voice/IP converter 125, bandwidth allocation, multiplexing and demultiplexing mechanism 115 is bi-directional. In addition to integrating data packets, the bandwidth allocation, multiplexing and demultiplexing mechanism 115 is also adapted to segregate data packets on the composite IP data channel into each of a plurality of voice channels.

Voice/IP Converter 125 includes one or more communication ports, such as telephonic port 117, adapted for coupling to one or more telephonic devices 123. Bandwidth allocation, multiplexing and demultiplexing mechanism 115 includes at least one data port 116 adapted for coupling to one or more endpoint devices such as a computing device 127 or the like.

It is to be understood that the hardware configuration of mobile auxiliary communications facility 110 is presented for purposes of illustration. Although the bandwidth allocation and multiplexing/demultiplexing functions, as described herein, are shown as being performed by a single integrated device, this is for illustrative purposes, as any number of different devices could be employed—for instance, a first device for performing the multiplexing and demultiplexing processes, and a second device for performing the bandwidth allocation process. Moreover, the functionalities of bandwidth allocation, multiplexing and demultiplexing mechanism 115 and voice/IP converter 125 could be combined and implemented by a single, integrated hardware element. As may be appreciated by those skilled in the art, various other hardware implementations for performing the above-described functionalities of mobile auxiliary communications facility 110 are also possible.

Gateway hub 106 is coupled to a telephonic communications center 111, using a direct connection, and/or optionally over the PSTN 105 (public switched telephone network) using telephonic communication pathways 118 and 119. Telephonic communications center 111 is equipped with telephonic equipment and personnel so as to provide alternate or supplemental communications in situations where communications to an existing facility have been disrupted, or in situations where it is necessary to implement communications to and from a remote location that lacks the required communications infrastructure. In the example of FIG. 1, this existing facility or remote location is represented by communication-disrupted facility and/or remote facility 101. Gateway hub 106 is also coupled to at least one data network, shown in FIG. 1 as data center 102. Illustratively, data center 102 could represent the Internet, a proprietary corporate network, and/or a governmental communications network. This connection is provided via a redirected data line 113. Gateway hub 106 includes a mechanism for sending digital and/or analog voice traffic, after conversion from a packet format, to and from the telephonic communications center 111, illustratively over PSTN 105. This mechanism is also adapted for routing data packets to and from data center 102. Gateway hub 106 may include a mechanism for demultiplexing and multiplexing, allocating bandwidth on the basis of voice activity, and/or allocating bandwidth on the basis of one or more QoS (quality of service) parameters. This mechanism can be implemented using a single hardware element or, alternatively, any combination of discrete hardware elements may be employed. The multiplexing, demultiplexing, and bandwidth allocation processes to be implemented by gateway hub 106 are substantially analogous to the corresponding processes described above in connection with mobile auxiliary communications facility 110. Gateway hub 106 is coupled to a satellite earth station 107 in communication with satellite 108, and mobile auxiliary communications facility 110 is coupled to a mobile satellite earth station 109 in communication with satellite 108.

Consider a situation where communications to an existing facility have been disrupted, or where communication pathways must be provided to a remote location. As mentioned above, this facility or location is denoted in FIG. 1 as communication-disrupted facility and/or remote facility 101. In cases where existing communications have been disrupted, assume that existing telephonic links, shown as interrupted telephone line 104, are broken, and that existing data lines, shown as interrupted data line 103, are also broken. If a remote location is involved, there would likely not be any preexisting data line 103 or telephone line 104, but the remainder of the present analysis is nevertheless applicable.

In operation, mobile auxiliary communications facility 110 may be deployed to a location that is convenient to, accessible from, and/or proximate to, communication-disrupted facility and/or remote facility 101. Mobile auxiliary communications facility 110 provides bi-directional telephonic ports 117 to which any number of telephonic devices, such as telephonic device 123, may be connected, and bi-directional data ports 116 to which any number of computing devices, such as computing device 127, may be connected. Effectively, mobile auxiliary communications facility 110 may be deployed to any desired location or locations throughout the world, so as to provide bi-directional telephonic communication paths and bi-directional Internet Protocol data paths to any such location or locations. In this manner, mobile auxiliary communications facility 110 provides an alternative to non-operational and/or nonexistent landline communication links.

Mobile auxiliary communications facility receives IP data from data ports 116 and telephonic data from telephonic ports 117. This data is integrated into a composite IP data channel and then conveyed to mobile satellite earth station 109. Likewise, mobile satellite earth station 109 conveys a composite IP data channel to mobile auxiliary communications facility 110, whereupon mobile auxiliary communications facility 110 segregates this data and routes it to the appropriate port of telephonic ports 117 and/or to the appropriate port of data ports 116. Mobile auxiliary communications facility 110 converts the data from IP format to voice format before placing the data at the appropriate telephonic port. Optionally, this conversion process may be implemented at telephonic device 123, and not by auxiliary communications facility 110.

An outgoing composite IP data channel is conveyed from mobile auxiliary communications facility 110 to mobile satellite earth station 109, and an incoming composite IP data channel is conveyed from mobile satellite earth station 109 to auxiliary communications facility 110. Satellite 108 receives this incoming data channel from satellite earth station 107, and transmits this data channel to mobile satellite earth station 109. Satellite 108 receives the outgoing data channel from mobile satellite earth station 109, and transmits this data channel to satellite earth station 107. Although the system of FIG. 1 shows one satellite 108, in practice, satellite 108 may be implemented using one or more satellites. This satellite, or these satellites, could, but need not, be placed in geosynchronous orbit around the earth.

Satellite earth station 107 receives a composite IP data channel from satellite 108 and transmits a composite IP data channel to satellite 108. The IP data channel received by satellite earth station 107 is conveyed to gateway hub 106. The routing mechanism of gateway hub 106 segregates incoming packets on the received composite IP data channel, routing packets, and converting to analog and/or digital voice traffic onto telephonic communications center 111 over lines 118 and 119, and routing packets representing IP data to data center 102 over redirected data line 113. These processes are bi-directional, in that gateway hub 106 places voice and telephonic communications received from telephonic communications center into one or more packets compatible with IP data transmission protocols. Gateway hub 106 integrates these packets with data IP packets that are received from data center 102. The voice and IP data packets are integrated into a single composite IP data channel, and gateway hub 106 then conveys this composite IP data channel to satellite earth station 107.

In this manner, the system of FIG. 1 provides communication pathways to a remote and/or disrupted facility by using a mobile auxiliary communications facility 110 coupled to existing terrestrial networks (illustratively, data center 102 and telephonic communications center 111) via a satellite-equipped communications link and a gateway hub. The gateway hub and the mobile auxiliary communications facility each include bi-directional conversion and routing mechanisms for converting voice and telephonic signals into IP packets, for converting IP packets into voice and telephonic signals, and for routing packets on a composite IP data stream to appropriate telephonic and/or data ports.

Figure 2:
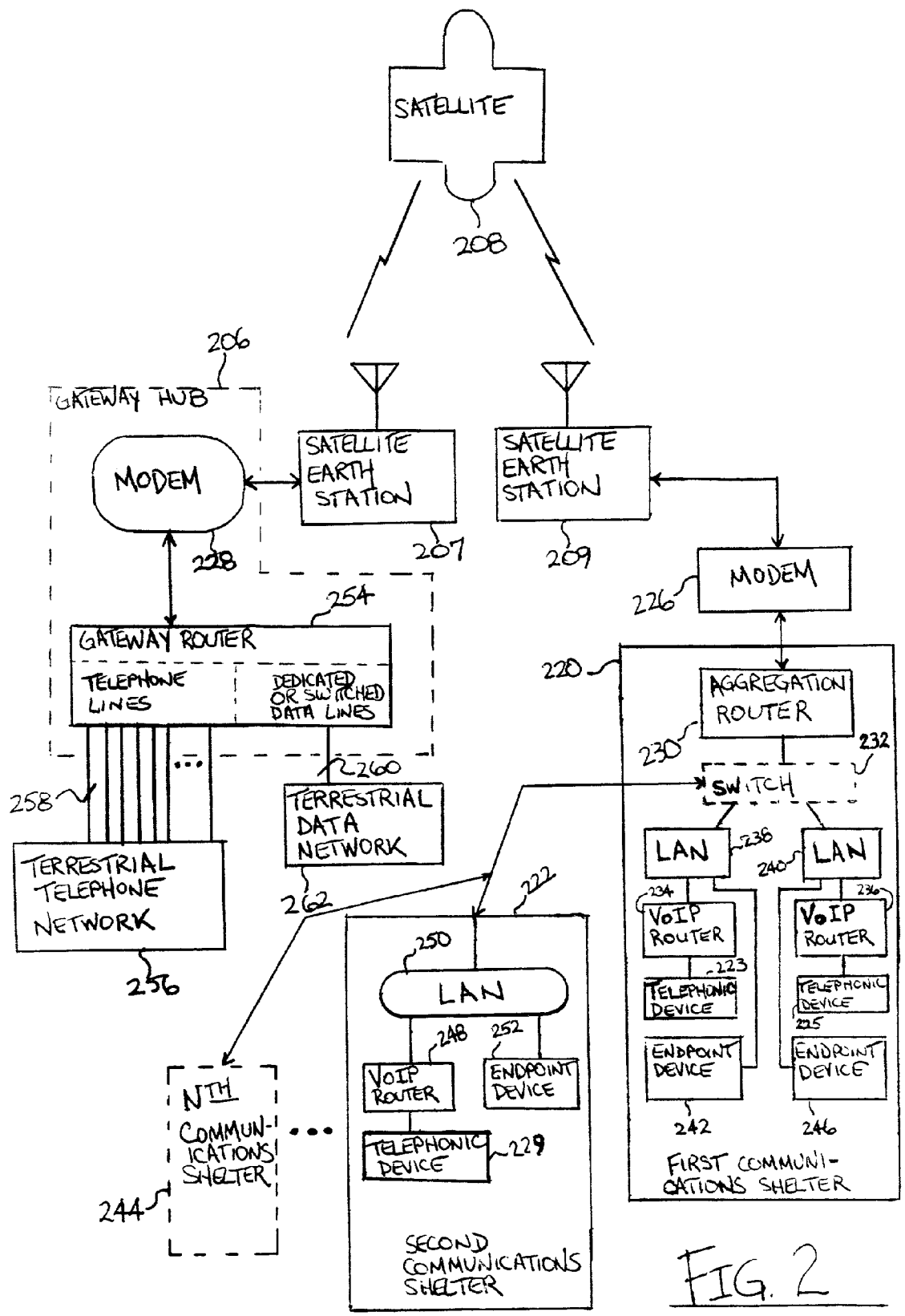
FIG. 2. is a hardware block diagram showing a communications system for implementing the techniques of the present invention in accordance with a second embodiment disclosed herein.

FIG. 2. is a hardware block diagram showing a communications system for implementing the techniques of the present invention in accordance with a further embodiment disclosed herein. Pursuant to the embodiment of FIG. 2, the mobile auxiliary communications facility 110 of FIG. 1 is provided in the form of one or more mobile communications shelters, such as first communications shelter 220, second communications shelter 222, and Nth communications shelter 244. Each of these communications shelters 220, 222, 244 is equipped with a mechanism to implement telephonic communications and IP data communications at a communications-disrupted facility or at a remote location.

As a preliminary matter, the communication pathways in FIG. 2 are bi-directional, so as to provide communication in both directions between a communications shelter (220, 222, or 244) and a terrestrial network (terrestrial telephone network 256 and/or terrestrial data network 262). However, for the sake of expediency, the outgoing communications path, in a direction from communications shelters 220, 222, 244 to the terrestrial networks will now be described, with the understanding that there is also an incoming communications path, similar to that described above in connection with FIG. 1. One or more communications pathways may optionally be provided between any two or more of the communications shelters 220, 222, and/or 244.

Returning now to FIG. 2, first and second communications shelters 220, 222 are equipped with one or more endpoint devices 242, 246 and 252, respectively, which may represent computing devices, personal computers, laptops, mainframe computers, palm pilots, or the like, or any combination thereof. These endpoint devices 242, 246 and 252 are each coupled to a local area network (LAN), shown in FIG. 2 as LANs 238, 240 and 250, respectively. First and second communications shelters 220, 222 are also equipped with one or more telephonic devices 223, 225, 229, respectively, which may represent plain old telephone devices (so-called POTS telephone sets), DTMF (touch-tone) telephones, a PBX (private branch exchange), a wireless telephonic communications system, or the like, or any combination thereof. These telephonic devices are each coupled to a VoIP (Voice-to-Internet Protocol) router 234, 236, 248. In turn, each VoIP router 234, 236, 248 is coupled to a LAN, such as LAN 238, 240, or 250. LANs 238 and 240 are coupled, through an optional switch 232, to an aggregation router 230. LAN 250 is coupled, through optional switch 232, to aggregation router 230.

The VoIP routers 234, 236, and 248 implement a conversion process by which incoming voice, speech, and/or audio signals are converted into a packet format suitable for transmission using IP data protocols. These VoIP routers 234, 236, and 248 also implement a deconversion process by which incoming IP packets representing voice, speech, and/or audio are deconverted back into voice, speech, and/or audio signals. Aggregation router 230 implements a bandwidth allocation, multiplexing and demultiplexing process. The demultiplexing process is a process by which a composite IP data channel is separated into a plurality of individual IP data channels and/or voice channels. The multiplexing process is a process by which a plurality of individual IP data channels and voice channels are combined into a single composite IP data channel. The bandwidth allocation process allocates the available bandwidth of a communications link by regulating the manner in which voice and data packets are combined into the single composite IP data channel. For example, this combination process may be performed in accordance with usage, demand, and/or a set of quality of service (QoS) prioritization parameters. Bandwidth may also be allocated by the aggregate router, 230 and/or the VoIP routers 234, 236, and/or 248, sensing the relative level of voice activity, and, in response thereto, placing a greater or lesser proportion of IP packets representing voice on the composite IP data channel.

Aggregation router 230 and VoIP Routers 234, 236, and 248 may be distributed amongst any number of communications shelters. In practice, however, it is to be expected that a single aggregation router 230 would be coupled to a plurality of VoIP Routers 234, 236, and 248 situated at one or more communications shelters 220, 222, 244. Alternatively, a single router could be used to implement the functionality of the VoIP Routers 234, 236, and 248, as well as aggregation router 230, or these functions could be distributed amongst a plurality of different routers. In the example of FIG. 2, it is assumed for purposes of illustration that more than one shelter is to be deployed at the communications-disrupted facility or remote location. Accordingly, aggregation router 230 of first communications shelter 220 includes an aggregation mechanism for aggregating communications from, and deaggregating communications to, additional communications shelters such as second communications shelter 222 and Nth communications shelter 244.

Aggregation router 230 is coupled to a modem 226 which, in turn, is coupled to a satellite earth station 209. Although modem 226 and satellite earth station 209 are not shown as part of the communications shelters 220, 222, 244 of FIG. 2, this is for illustrative purposes only. Modem 226, aggregation router 230, and/or earth station 209 may, in fact, be integrated into one or more of these communications shelters 220, 222, 244. Additionally, each communications shelter could be equipped with its own aggregation router 230, modem 226 and/or earth station 209, or any number of aggregation routers, modems and/or earth stations may be shared among any number of communications shelters.

The composite IP data channel generated by aggregation router 230 is conveyed to first modem 226, where the data channel is placed into a format suitable for transmission over a wireless data link. First modem 226 is coupled to a satellite earth station 209, which conveys the composite data channel to an orbiting satellite 208. Orbiting satellite 208 then relays the composite data stream, through a second modem 228, to a gateway hub 206. Gateway hub 206 is coupled to a terrestrial telephone network 256 and also to a terrestrial data network 262. Gateway hub 206 includes gateway router 254 which is adapted to direct each of a plurality of incoming IP packets on a composite IP data channel to an appropriate telephone line 258 or to an appropriate data line 260, following conversion to analog and/or digital voice traffic.

Communication shelters 220, 222 and 244 provide a mechanism by which integrated advanced telephone services, standard telephone services, and/or computer network services may be accessed from remote locations. These services are provided by using gateway hub 206 to access existing telephone infrastructure, such as terrestrial telephone network 256, and also to access existing computer systems, such as terrestrial data network 262. Any number of fixed and/or mobile communications shelters 220, 222 and 244 may be utilized to meet the requirements of specific system applications. Accordingly, the present system is scaleable to meet the communication requirements of small, medium-sized, and large applications. For larger applications, gateway hub 206 may be connected to a plurality of remote sites or communication-disabled locations through earth-orbiting satellite 208. Users at multiple remote sites are then able to communicate with gateway hub 208 in a substantially simultaneous manner.

The above-described arrangement is merely illustrative of the principles of the present invention. Numerous modifications and adaptations thereof will be readily apparent to those skilled in the art without departing from the spirit and scope of the present invention.

We claim:

1. A communications system for use with a satellite-equipped link to establish one or more Internet Protocol (IP) communication pathways between a first location and a second location; the communications system comprising:
   (a) a gateway hub, at the first location, coupled to a terrestrial data network and also to a terrestrial telephonic network; and
   (b) a mobile auxiliary communications facility at the second location, wherein the mobile auxiliary communications facility includes a utilization mechanism for utilizing the IP communication pathways to implement one or more bi-directional telephonic communication links and one or more bi-directional data links,
   wherein the mobile auxiliary communications facility further includes a conversion/deconversion mechanism for converting voice, speech, and/or audio signals into a packet format compatible with standard Internet Protocol (IP) data transmissions, and also for deconverting an IP data packet transmission into a voice, speech, and/or audio signal, and
   wherein the mobile auxiliary communications facility further includes a bandwidth allocation, multiplexing and demultiplexing mechanism for allocating the available bandwidth of a communications link by combining voice and data packets into a single composite IP data channel on at least one of the one or more IP communication pathways
   wherein the mobile auxiliary communications facility is provided in the form of one or more mobile communications shelters,
   wherein the conversion/deconversion mechanism is implemented by one or more VoIP (Voice to Internet Protocol) Routers, and the bandwidth allocation, multiplexing and demultiplexing mechanism is implemented by an aggregation router, such that the aggregation router, coupled to one or more VoIP Routers, allocates the available bandwidth of a communications link by combining voice and data packets into a single composite IP data channel,
   wherein the VoIP router and the aggregation router are distributed amongst a plurality of different physical routers, such that a specified physical router can function as a VoIP router, an aggregation router, or both.

2. The communications system of claim 1 wherein the bandwidth allocation, multiplexing and demultiplexing mechanism combines voice and data packets in accordance with usage, demand, and/or a set of quality of service (QoS) prioritization parameters.

3. The communications system of claim 2 wherein the bandwidth allocation, multiplexing and demultiplexing mechanism responds to a momentary lack of voice activity by temporarily reducing the number of voice IP packets on the single composite IP data channel.

4. The communications system of claim 1 wherein the bandwidth allocation, multiplexing and demultiplexing mechanism segregates data packets on the single composite IP data channel into each of a plurality of voice channels.

5. The communications system of claim 1 wherein the bandwidth allocation, multiplexing and demultiplexing mechanism includes at least one data port to couple to one or more endpoint devices.

6. The communications system of claim 1 wherein voice and data packets are combined by sensing the relative level of voice activity, and, in response thereto, placing a greater or lesser proportion of IP packets representing voice on the composite IP data channel.

7. The communications system of claim 1 wherein a single router is used to implement the VoIP Router as well as the aggregation router.

8. The communications system of claim 1 wherein the composite IP data channel generated by the aggregation router is conveyed to a first modem, wherein the data channel is placed into a format suitable for transmission over a wireless data link.

9. The communications system of claim 8 wherein the first modem is coupled to a satellite earth station which conveys the composite data channel to an orbiting satellite.

10. The communications system of claim 9 wherein the orbiting satellite relays the composite data stream, through a second modem, to the gateway hub.

11. The communications system of claim 10 wherein the gateway hub includes a routing mechanism to direct each of a plurality of incoming IP packets on a composite IP data channel to an appropriate telephone line or data line, following conversion to analog and/or digital voice traffic.

12. The communications system of claim 11 wherein the communication shelters provide a mechanism by which telephonic services as well as computer network services may be accessed from remote locations or communication-disabled locations, such that these services are provided by using a gateway hub to access existing terrestrial telephone infrastructure and computer networks.

13. The communications system of claim 12 wherein any number of mobile communications shelters may be utilized to meet the requirements of specific system applications, such that the communications system is scaleable to meet the communication requirements of small, medium-sized, and large applications.

14. The communications system of claim 13 wherein the gateway hub is connected to a plurality of these remote or communication-disabled locations through an earth-orbiting satellite, wherein users at multiple remote site communicate with the gateway hub in a substantially simultaneous manner.

15. A mobile auxiliary communications facility for use with (i) a satellite-equipped link to establish one or more Internet Protocol (IP) communication pathways between a first location and a second location, and (ii) a gateway hub, at the first location, coupled to a satellite earth station, a terrestrial data network, and a terrestrial telephonic network, the mobile auxiliary communications facility for use at the second location, and comprising:

a utilization mechanism for utilizing the IP communication pathways to implement one or more bi-directional telephonic communication links and one or more bi-directional data links; and further comprising:

a conversion/deconversion mechanism for converting voice, speech, and/or audio signals into a packet format compatible with standard Internet Protocol (IP) data transmissions, and also for deconverting an IP data packet transmission into a voice, speech, and/or audio signal;

a bandwidth allocation, multiplexing and demultiplexing mechanism for allocating the available bandwidth of a communications link by combining voice and data packets into a single composite IP data channel on at least one of the one or more IP communication pathways; and one or more mobile communications shelters, wherein the conversion/deconversion mechanism is implemented by one or more VoIP (Voice to Internet Protocol) Routers, and the bandwidth allocation, multiplexing and demultiplexing mechanism is implemented by an aggregation router, such that the aggregation router, coupled to one or more VoIP Routers, allocates the available bandwidth of a communications link by combining voice and data packets into a single composite IP data channel, wherein the VoIP router and the aggregation router are distributed amongst a plurality of different physical routers, such that a specified physical router can function as a VoIP router, an aggregation router, or both.

16. The mobile auxiliary communications facility of claim 15 wherein the bandwidth allocation, multiplexing and demultiplexing mechanism combines voice and data packets in accordance with usage, demand, and/or a set of quality of service (QoS) prioritization parameters.

17. The mobile auxiliary communications facility of claim 16 wherein the bandwidth allocation, multiplexing and demultiplexing mechanism responds to a momentary lack of voice activity by temporarily reducing the number of voice IP packets on the single composite IP data channel.

18. The mobile auxiliary communications facility of claim 15 wherein the bandwidth allocation, multiplexing and demultiplexing mechanism is adapted to segregate data packets on the single composite IP data channel into each of a plurality of voice channels.

19. The mobile auxiliary communications facility of claim 15 wherein the bandwidth allocation, multiplexing and demultiplexing mechanism includes at least one data port to couple to one or more endpoint devices.

20. The mobile auxiliary communications facility of claim 15 wherein voice and data packets are combined by sensing the relative level of voice activity, and, in response thereto, placing a greater or lesser proportion of IP packets representing voice on the composite IP data channel.

21. The mobile auxiliary communications facility of claim 15 wherein a single router is used to implement the VoIP Router as well as the aggregation router.

22. The mobile auxiliary communications facility of claim 15 wherein the composite IP data channel generated by the aggregation router is conveyed to a first modem, wherein the data channel is placed into a format suitable for transmission over a wireless data link.

23. The mobile auxiliary communications facility of claim 22 wherein the first modem is coupled to a satellite earth station which conveys the composite data channel to an orbiting satellite.

24. The mobile auxiliary communications facility of claim 23 wherein the orbiting satellite relays the composite data stream, through a second modem, to the gateway hub.

25. The mobile auxiliary communications facility of claim 24 wherein the gateway hub includes a routing mechanism to direct each of a plurality of incoming IP packets on a composite IP data channel to an appropriate telephone line or data line, following conversion to analog and/or digital voice traffic.

26. The mobile auxiliary communications facility of claim 25 wherein the communication shelters provide a mechanism by which telephonic services as well as computer network services may be accessed from remote locations or communication-disabled locations, such that these services are provided by using a gateway hub to access existing terrestrial telephone infrastructure and computer networks.

27. The mobile auxiliary communications facility of claim 26 wherein any number of mobile communications shelters may be utilized to meet the requirements of specific system applications, such that the communications system is scaleable to meet the communication requirements of small, medium-sized, and large applications.

28. The mobile auxiliary communications facility of claim 27 wherein the gateway hub is connected to a plurality of these remote or communication-disabled locations through an earth-orbiting satellite, wherein users at multiple remote sites communicate with the gateway hub in a substantially simultaneous manner.

29. A method for use with (i) a satellite-equipped link to establish one or more Internet Protocol (IP) communication pathways between a first location and a second location, and (ii) a gateway hub, at the first location, coupled to a terrestrial data network and also to a terrestrial telephonic network; the method comprising the steps of:
   (a) utilizing the IP communication pathways to implement one or more bi-directional telephonic communication links at the second location and converting voice, speech, and/or audio signals into a packet format compatible with standard Internet Protocol (IP) data transmissions;
   (b) utilizing the IP communication pathways to implement one or more bi-directional data links at the second location;
   (c) allocating the available bandwidth of the satellite equipped link by combining voice and data packets into a single composite P data channel on at least one of the one or more IP communication pathways;
   providing an auxiliary communications facility at the second location in the form of one or more mobile communications shelters, wherein the one or more shelters perform steps (a) and (b);
   wherein step (a) is implemented by one or more VoIP (Voice to Internet Protocol) Routers coupled to an aggregation router, the method further including the step of the aggregation router allocating the available bandwidth of a communications link by combining voice and data packets into a single composite IP data channel; and
   conveying the composite IP data channel generated by the aggregation router to a first modem
   wherein the VoIP router and the aggregation router are distributed amongst a plurality of different physical routers, such that a specified physical router can function as a VoIP router, an aggregation router, or both.

30. The method of claim 29 wherein the step of allocating the available bandwidth further includes the step of combining voice and data packets in accordance with usage, demand, and/or a set of quality of service (QoS) prioritization parameters.

31. The method of claim 30 wherein the step of allocating the available bandwidth includes the step of responding to a momentary lack of voice activity by temporarily reducing the number of voice IP packets on the single composite IP data channel.

32. The method of claim 29 wherein the step of allocating the available bandwidth includes the step of segregating data packets on the single composite IP data channel into each of a plurality of voice channels.

33. The method of claim 29 for use with at least one data port to couple to one or more endpoint devices.

34. The method of claim 29 wherein voice and data packets are combined by sensing the relative level of voice activity, and, in response thereto, placing a greater or lesser proportion of IP packets representing voice on the composite IP data channel.

35. The method of claim 29 wherein a single router is used to implement the VoIP Router as well as the aggregation router.

36. The method of claim 29 further including the step of the modem converting the data channel into a format suitable for transmission over a wireless data link.

37. The method of claim 36 wherein the first modem is coupled to a satellite earth station, the method further comprising the step of the earth station conveying the composite data channel to an orbiting satellite.

38. The method of claim 37 further including the step of the orbiting satellite relaying the composite data stream, through a second modem, to the gateway hub.

39. The method of claim 38 further including the step of directing each of a plurality of incoming IP packets on a composite IP data channel to an appropriate telephone line or data line, following conversion to analog and/or digital voice traffic.

40. The method of claim 39 further including the step of providing an access mechanism at the communication shelters by which telephonic services as well as computer network services may be accessed from the second location.

41. The method of claim 40 further including the step of deploying one or more communication shelters to the second location, wherein the second location comprises a remote location and/or a communication-disabled location.

42. The method of claim 41 further including the step of using the satellite equipped communications link and the gateway hub to access existing terrestrial telephone infrastructure and computer networks from the one or more communications shelters at the second location.

43. The method of claim 41 further including the step of deploying any number of mobile communications shelters to the second location to meet the requirements of specific system applications.

44. The method of claim 43 further including the step of providing a communications link to the gateway hub from a plurality of remote or communication-disabled locations through an earth-orbiting satellite.

* * * * *